March 11, 1924.

H. SAMUELS ET AL 1,486,805

NONSKID DEVICE

Filed April 4, 1922

2 Sheets-Sheet 1

Inventor
H. Samuels,
R. Briggs.

By
Attorney

March 11, 1924.
H. SAMUELS ET AL
1,486,805
NONSKID DEVICE
Filed April 4, 1922
2 Sheets-Sheet 2
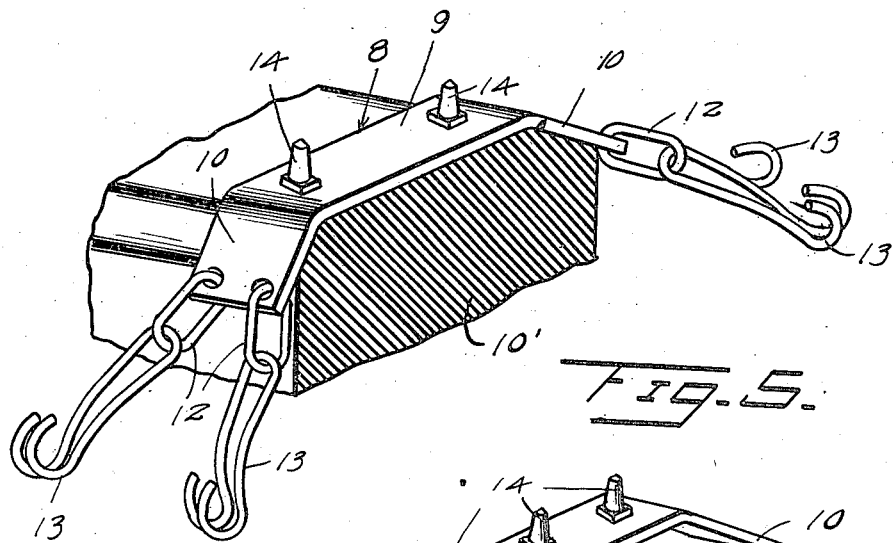
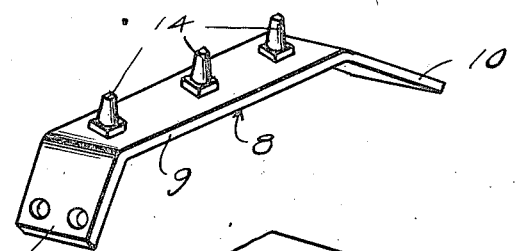
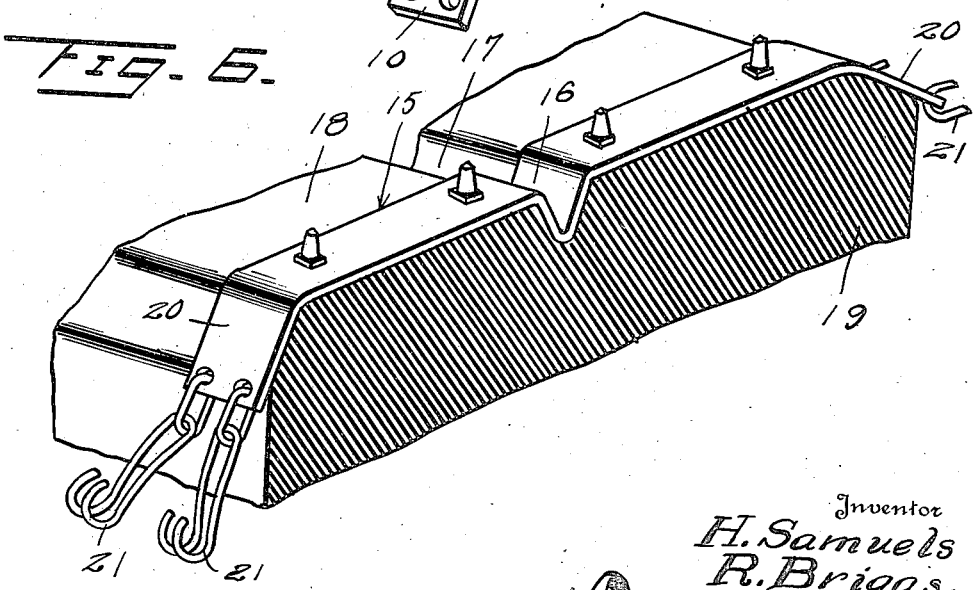
Inventor
H. Samuels
R. Briggs.
By
Attorney Patented Mar. 11, 1924.

1,486,805

UNITED STATES PATENT OFFICE.

HOWARD SAMUELS AND ROBERT BRIGGS, OF DELHI, NEW YORK.

NONSKID DEVICE.

Application filed April 4, 1922. Serial No. 549,422.

*To all whom it may concern:*

Be it known that we, HOWARD SAMUELS and ROBERT BRIGGS, citizens of the United States, residing at Delhi, in the county of Delaware and State of New York, have invented certain new and useful Improvements in a Nonskid Device; and we do hereby declare the following to be a full, clear, and exact description of the invention, such as will enable others skilled in the art to which it appertains to make and use the same.

This invention relates to new and useful improvements in nonskid devices for either pneumatic or solid tires and has for its primary object the provision of spaced bars or members connected to the usual side chains and being curved to conform to the transverse curvature of a tire having calks to bite into the ground for giving the tire the desired traction and prevent skidding thereof, and also said members having the calks removable therefrom whereby any one of the calks when worn or broken may be easily and quickly detached and substituted by a new one.

Another object of this invention is the provision of nonskid devices of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawing, in which:—

Figure 1:
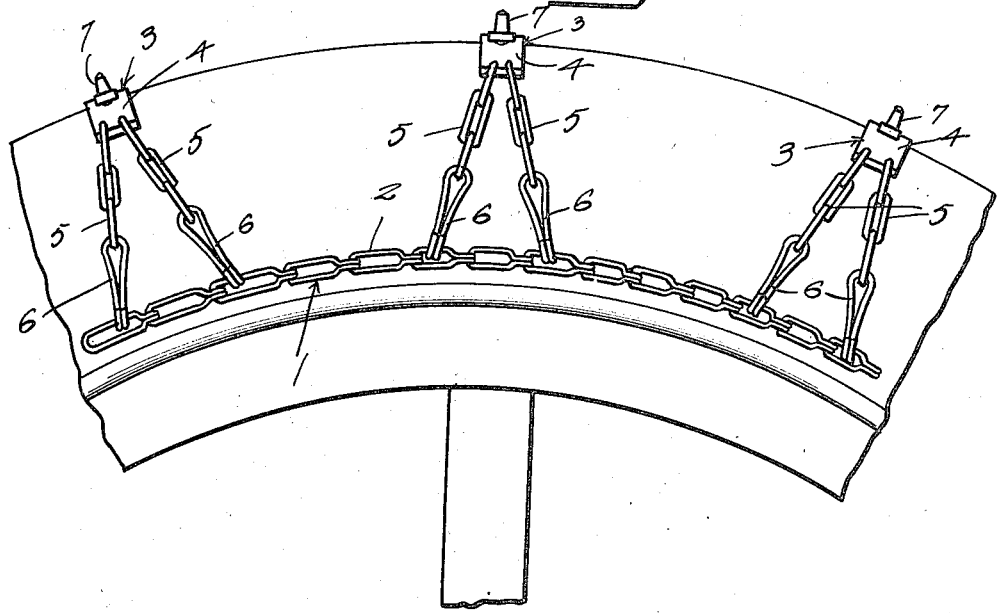
Figure 2:
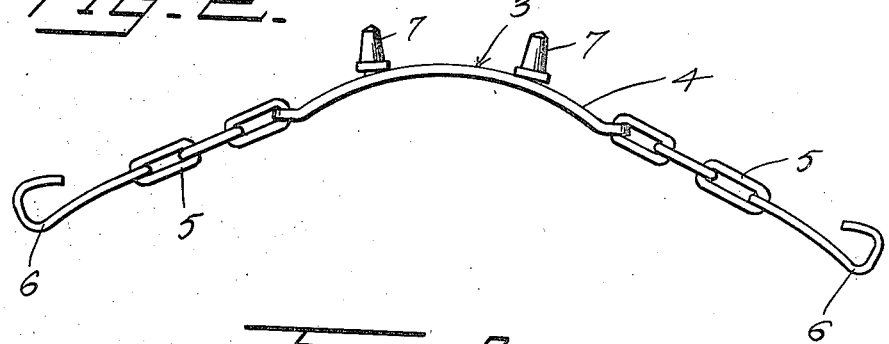
Figure 3:
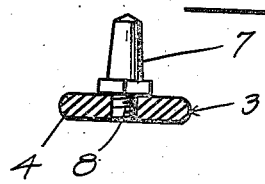

Figure 1 is a fragmentary side elevation, illustrating a non-skid device constructed in accordance with our invention and showing the same applied to a tire, Figure 2 is an edge view, illustrating one of the non-skid members, Figure 3 is a detail sectional view, illustrating the connection between the member and the calks, Figure 4 is a perspective view, illustrating a modified form of our invention and applied to a solid tire, Figure 5 is a similar view, illustrating another modified form of our invention, Figure 6 is a similar view, illustrating another modified form of our invention applied to a double tread solid tire.

Referring in detail to the drawings, the numeral 1 indicates as an entirety a non-skid device which includes the usual side chains 2 to which are secured our improved non-skid element 3 and the latter each includes a curved bar or member 4 adapted to extend transversely of and snugly fit the tread of a tire and is provided at its ends with openings to receive short chain sections 5 to which are secured fastening links 6 in the form of hooks that engage in the links of the side chains and have their hook portions bent into engagement with their major portion to firmly fasten the member 4 to the side chains. The fastening members 6 are arranged in pairs and the fastening members of each pair diverge and are fastened or secured to spaced links of the side chains. The member 4 is constructed from flat material and has secured to its outer face calks 7 that have screw threaded shanks 8 adapted to be threaded into screw threaded openings formed in the member 4. The calks are adapted to bite into the ground for the purpose of giving the tire to which the device is applied the desired traction and consequently prevent skidding.

Referring to our modified form of invention shown in Figure 4, the bar or member 8 comprises a straight portion 9 with inclined diverging portions 10 consequently forming the member 8 of a shape to fit the tread portion of a solid tire 10. The ends of the inclined portions 10 are provided with openings to receive short chain sections 12 to which the fastening elements 13 are secured. The modified form of invention shown in Figure 5 is similar to the form just described except that a greater number of calks 14 are employed. The purpose of using the greater number of calks is to increase the traction containing qualities of the device and also when the device is constructed to grip larger size tires it is desirable to increase the number of calks.

Referring to our modified form of invention shown in Figure 6, the bar or member 15 intermediate its ends is offset to form a V-shaped portion 16 adapted to fit within the annular groove 17 formed between the tread portions 18 of a double tread tire 19. The bar or member 15 is provided with the inclined portions 20 to which the fastening elements 21 are secured. Sometimes it is desirable to employ chains to pass about the spokes and fasten to the elements 21 instead of employing the usual side chains. The member or bar has the calks 7 detachably secured thereto and the number of such calks may be increased or decreased depending on the size of the tire the device is constructed to be used upon.

While we have shown and described the preferred embodiment of our invention, it is to be understood that minor changes in construction, combination and arrangement of parts may be made without departing from the spirit and scope of the following claim.

Having thus described the invention, what we claim is:—

An anti-skid device comprising a bar, said bar bent to provide a V-shaped inwardly deflected portion midway its length, said V-shaped portion adapted to fit snugly within the V-shaped groove in the tread of a double tread tire, traction lugs carried by the portions of the bar intermediate the V-shaped portion and the ends of the bar, and said bar having its end portions inwardly and laterally inclined to snugly engage the inclined edges of the tire.

In testimony whereof we affix our signatures in presence of two witnesses.

HOWARD SAMUELS.
ROBERT BRIGGS.

Witnesses:
EDWARD O'CONNOR,
W. McFARLAND.